(12) United States Patent
Broberg et al.

(10) Patent No.: US 7,570,583 B2
(45) Date of Patent: Aug. 4, 2009

(54) EXTENDING SONET/SDH AUTOMATIC PROTECTION SWITCHING

(75) Inventors: Robert Broberg, San Francisco, CA (US); David A. Getchell, Castro Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 885 days.

(21) Appl. No.: 11/059,484

(22) Filed: Feb. 15, 2005

(65) Prior Publication Data

US 2005/0141415 A1  Jun. 30, 2005

Related U.S. Application Data

(63) Continuation of application No. 08/986,250, filed on Dec. 5, 1997, now abandoned.

(51) Int. Cl.
*H04L 12/26* (2006.01)
(52) U.S. Cl. ........................ 370/219; 370/227
(58) Field of Classification Search ................. 370/217, 370/219, 220, 227
See application file for complete search history.

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |

(Continued)

FOREIGN PATENT DOCUMENTS

EP    0384758 A2    8/1990

(Continued)

OTHER PUBLICATIONS

Allen, M., "Novel IPX Over Various WAN Media (IPXW AN)", Network Working Group, RFC 1551, Dec. 1993, pp. 1-22.

(Continued)

*Primary Examiner*—William Trost, IV
*Assistant Examiner*—Toan D Nguyen
(74) *Attorney, Agent, or Firm*—Hickman Palermo Truong & Becker LLP (57) ABSTRACT

The invention provides a method and system for coupling a SONET/SDH network to a routing network that does not have a single point of failure. Multiple routers are coupled between the SONET/SDH network and the routing network, one for each data path; for example, a first router for the working data path and a second router for the protection data path. The routers intercommunicate to force APS to switch data paths bidirectionally, so as to allow only a single router for each data path.

20 Claims, 2 Drawing Sheets

U.S. PATENT DOCUMENTS

| | | |
|---|---|---|
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,905,233 A | 2/1990 | Cain et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,767 A | 10/1990 | Kinoshita et al. |
| 4,965,772 A | 10/1990 | Daniel et al. |
| 4,970,678 A | 11/1990 | Sladowski et al. |
| 4,979,118 A | 12/1990 | Kheradpir |
| 4,980,897 A | 12/1990 | Decker et al. |
| 4,991,169 A | 2/1991 | Davis et al. |
| 4,996,685 A | 2/1991 | Farese et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,034,919 A | 7/1991 | Sasai |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,115,495 A | 5/1992 | Tsuchiya et al. |
| 5,128,926 A | 7/1992 | Perlman et al. |
| 5,128,945 A | 7/1992 | Enns et al. |
| 5,136,580 A | 8/1992 | Videlock et al. |
| 5,166,930 A | 11/1992 | Braff et al. |
| 5,189,662 A | 2/1993 | Kleine-Altekamp |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,233,604 A | 8/1993 | Ahmadi et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,325,358 A | 6/1994 | Goeldner |
| 5,325,504 A | 6/1994 | Tipley et al. |
| 5,327,421 A | 7/1994 | Hiller et al. |
| 5,331,637 A | 7/1994 | Francis et al. |
| 5,335,224 A | 8/1994 | Cole et al. |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,432,784 A | 7/1995 | Ozveren |
| 5,436,886 A | 7/1995 | McGill |
| 5,442,457 A | 8/1995 | Najafi |
| 5,442,630 A | 8/1995 | Gagliardi et al. |
| 5,446,735 A | 8/1995 | Tobagi et al. |
| 5,448,559 A | 9/1995 | Hayter et al. |
| 5,452,294 A | 9/1995 | Natarajan |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,479,608 A | 12/1995 | Richardson |
| 5,485,455 A | 1/1996 | Dobbins et al. |
| 5,490,140 A | 2/1996 | Abensour et al. |
| 5,490,258 A | 2/1996 | Fenner |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweasey |
| 5,509,006 A | 4/1996 | Wilford et al. |
| 5,517,494 A | 5/1996 | Green |
| 5,519,704 A | 5/1996 | Farinacci et al. |
| 5,519,858 A | 5/1996 | Walton et al. |

| | | |
|---|---|---|
| 5,524,254 A | 6/1996 | Morgan et al. |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,550,816 A | 8/1996 | Hardwick et al. |
| 5,555,244 A | 9/1996 | Gupta et al. |
| 5,561,669 A | 10/1996 | Lenney et al. |
| 5,583,862 A | 12/1996 | Callon |
| 5,590,122 A | 12/1996 | Sandorfi et al. |
| 5,592,470 A | 1/1997 | Rudrapatna et al. |
| 5,598,532 A | 1/1997 | Liron |
| 5,598,581 A | 1/1997 | Daines et al. |
| 5,600,798 A | 2/1997 | Cherukuri et al. |
| 5,602,770 A | 2/1997 | Ohira |
| 5,604,868 A | 2/1997 | Komine et al. |
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |
| 5,632,021 A | 5/1997 | Jennings et al. |
| 5,633,865 A | 5/1997 | Short |
| 5,634,010 A | 5/1997 | Ciscon et al. |
| 5,638,359 A | 6/1997 | Peltola et al. |
| 5,640,399 A | 6/1997 | Rostoker et al. |
| 5,644,713 A | 7/1997 | Makishima |
| 5,644,718 A | 7/1997 | Belove et al. |
| 5,659,684 A | 8/1997 | Giavannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. |
| 5,684,797 A | 11/1997 | Aznar et al. |
| 5,687,324 A | 11/1997 | Green et al. |
| 5,689,506 A | 11/1997 | Chiussi et al. |
| 5,691,984 A | 11/1997 | Gardner et al. |
| 5,694,390 A | 12/1997 | Yamato et al. |
| 5,712,847 A | 1/1998 | Hata |
| 5,715,237 A | 2/1998 | Akiyoshi |
| 5,724,351 A | 3/1998 | Chao et al. |
| 5,740,097 A | 4/1998 | Satoh |
| 5,740,157 A * | 4/1998 | Demiray et al. ............. 370/219 |
| 5,742,760 A | 4/1998 | Picazo, Jr. et al. |
| 5,748,186 A | 5/1998 | Raman |
| 5,748,617 A | 5/1998 | McLain, Jr. |
| 5,754,547 A | 5/1998 | Nakazawa |
| 5,774,698 A | 6/1998 | Olnowich |
| 5,793,745 A | 8/1998 | Manchester |
| 5,796,742 A | 8/1998 | Klotzbach et al. |
| 5,802,054 A | 9/1998 | Bellenger |
| 5,835,696 A | 11/1998 | Hess |
| 5,835,710 A | 11/1998 | Nagami et al. |
| 5,841,874 A | 11/1998 | Kempke |
| 5,854,903 A | 12/1998 | Morrison et al. |
| 5,856,981 A | 1/1999 | Voelker |
| 5,859,837 A | 1/1999 | Crayford |
| 5,862,338 A | 1/1999 | Walker et al. |
| 5,867,666 A | 2/1999 | Harvey |
| 5,870,382 A | 2/1999 | Tounai et al. |
| 5,872,780 A * | 2/1999 | Demiray et al. ............. 370/359 |
| 5,884,017 A | 3/1999 | Fee |
| 5,892,924 A | 4/1999 | Lyon et al. |
| 5,898,686 A | 4/1999 | Virgile |
| 5,898,687 A | 4/1999 | Harriman et al. |
| 5,903,559 A | 5/1999 | Acharya et al. |
| 5,905,723 A | 5/1999 | Varghese et al. |
| 5,909,440 A | 6/1999 | Ferguson et al. |
| 5,978,115 A | 11/1999 | Condict et al. |
| 5,996,021 A | 11/1999 | Civanlar et al. |
| 6,011,780 A | 1/2000 | Vaman et al. |
| 6,021,112 A * | 2/2000 | Sugawara ............. 370/222 |
| 6,023,733 A | 2/2000 | Periasamy et al. |
| 6,032,194 A | 2/2000 | Gai et al. |
| 6,111,877 A | 8/2000 | Wilford et al. |
| 6,122,272 A | 9/2000 | Tomaszewski et al. |
| 6,144,633 A * | 11/2000 | Ikeda et al. ............. 370/217 |
| 6,219,739 B1 | 4/2001 | Dutt et al. |
| 6,229,787 B1 | 5/2001 | Byrne |
| 6,246,667 B1 | 6/2001 | Ballintine et al. |

FOREIGN PATENT DOCUMENTS

| | | |
|---|---|---|
| EP | 0431751 A1 | 6/1991 |
| EP | 0567217 A2 | 10/1993 |
| EP | 0570882 A2 | 11/1993 |
| WO | WO 93/07569 | 4/1993 |
| WO | WO 93/07692 | 4/1993 |
| WO | WO 94/01828 | 1/1994 |
| WO | WO 95/20850 | 8/1995 |

OTHER PUBLICATIONS

Berker, D., "3c589.c: A 3c589 EtherLink3 Ethernet Driver For Linux", becker@CESDIS.gsfc.nasa.gov, May 3, 1994, pp. 1-13.
Chowdhury, et al., "Alternative Bandwidth Allocation Algorithms for Packet Video in ATM Networks", INFOCOM 1992, pp. 1061-1068.
Doeringer, W., "Routing in Longest-Matching Prefixes", IEEE/ACM Transactions in Networking, vol. 4, No. 1, Feb. 1996, pp. 86-97.
Esaki, et al, "Datagram Delivery in an ATM-internet", 2334b IEICE Transaction on Communications, Mar. 1994, No. 3, Tokyo, Japan.
Fault Tolerant VCs—97-0391. Cisco Systems Date. May 1997.
IBM Corporation, "Method and Apparatus for the Statistical Multiplexing of Voice, Data and Image Signals", IBM Technical Disclosure Bulletin, No. 6, Nov. 1992, pp. 409-411.
Kushi, David M. et al., "Signaling Procedures for Fault-Tolerant Connections". Cisco Systems. The ATM Forum Technical Committee, Apr. 27-May 2, 1997. Chicago, Illinois, USA.
Mah, Bruce A., "Measurements and Observations of IP Multicast Traffic". The Tenet Group. University of California at Berkeley and International Computer Science Institute.
Pei, et al., "Putting Routing Tables in Silicon", IEEE Network Magazine, Jan. 1992, pp. 42-50.
Perkins, D., "Requirements for an Internet Standard Point-to-Point Protocol", Network Working Group, RFC 1547, Dec. 1993, pp. 1-19.
"Pluris Massively Parallel Routing". (White Paper).
Simpson, W., "The Point-to-Point Protocol (PPP)", Network Working Group, RFC 1548, Dec. 1993, pp. 1-53.
Soncodi, Adrian et al. "Proposed Information Elements For Fault-Tolerant Connections". Nortel (Northern Telecom), Ottawa, Ontario, Canada, K1Y-4H7. ATM-Forum Technical Committee. Montreal, Jul. 1997.
Stallings, William, "Data and Computer Communications", pp. 329-333, Prentice Hall, Upper Saddle River, New Jersey 07458.
Tsuchiya, P.F., "A Search Algorithm For Table Entries With Non-Contiguous Wildcarding," Abstract, Bellcore.
Zhang, et al., "Rate-Controlled Static-Priority Queuing", INFOCOM 1993, pp. 227-236.
Allen, M., "Novell IPX Over Various WAN Media (IPXW AN)", Network Working Group, RFC 1551, Dec. 1993, pp. 1-22.
Becker, D., "3c589.c: A 3c589 EtherLink3 Ethernet Driver For Linux", becker@CESDIS.gsfc.nasa.gov, May 3, 1994, pp. 1-13.
Chowdhury, et al., "Alternative Bandwidth Allocation Algorithms for Packet Video in ATM Networks", INFOCOM 1992, pp. 1061-1068.
Doeringer, W., "Routing in Longest-Matching Prefixes", IEEE/ACM Transactions in Networking, vol. 4, No. 1, Feb. 1996, pp. 86-97.
Esaki, et al., "Datagram Delivery in an ATM-internet", 2334b IEICE Transaction on Communications, Mar. 1994, No. 3, Tokyo, Japan.
Fault Tolerant VCs—97-0391. Cisco Systems Date. May 1997.
IBM Corporation, "Method and Apparatus for the Statistical Multiplexing of Voice, Data and Image Signals", IBM Technical Disclosure Bulletin, No. 6, Nov. 1992, pp. 409-411.
Kushi, David M. et al., "Signaling Procedures for Fault-Tolerant Connections". Cisco Systems. The ATM Forum Technical Committee, Apr. 27-May 2, 1997. Chicago, Illinois, USA.

Mah, Bruce A., "Measurements and Observations of IP Multicast Traffic". The Tenet Group. University of California at Berkeley and International Computer Science Institute. 1994.

Pei, et al., "Putting Routing Tables in Silicon", IEEE Network Magazine, Jan. 1992, pp. 42-50.

Perkins, D., "Requirements for an Internet Standard Point-to-Point Protocol", Network Working Group, RFC 1547, Dec. 1993, pp. 1-19.

"Pluris Massively Parallel Routing". (White Paper) 1996.

Simpson, W., "The Point-to-Point Protocol (PPP)", Network Working Group, RFC 1548, Dec. 1993, pp. 1-53.

Soncodi, Adrian et al. "Proposed Information Elements For Fault-Tolerant Connections". Nortel (Northern Telecom), Ottawa, Ontario, Canada, K1Y-4H7. ATM-Forum Technical Committee. Montreal, Jul. 1997.

Stallings, William, "Data and Computer Communications", pp. 329-333, Prenctice Hall, Upper Saddle River, New Jersey 07458, 1999.

Tsuchiya, P.F., "A Search Algorithm For Table Entries With Non-Contiguous Wildcarding," Abstract, Bellcore, 1991.

Zhang, et al., "Rate-Controlled Static-Priority Queuing", INFOCOM 1993, pp. 227-236.

* cited by examiner

EXTENDING SONET/SDH AUTOMATIC PROTECTION SWITCHING

This application claims domestic priority under 35 U.S.C. §120 as a continuation of prior U.S. non-provisional application Ser. No. 08/986,250, filed Dec. 5, 1997 now abandoned, entitled "EXTENDNG SONET/SDH AUTOMATIC PROTECTION SWITCHING," naming Robert Broberg and David Getchell as inventors, the entire disclosure of which is hereby incorporated by reference for all purposes as if fully set forth herein.

BACKGROUND OF THE INVENTION

1. Field of the Invention

This invention relates to extending SONET/SDH Automatic Protection Switching.

2. Related Art

In a SONET/SDH communication network, redundancy is achieved by assigning one protection data path for a set of N working data paths. In network equipment for SONET/SDH networks using a "one-plus-one" model, there is one protection data. path for each working data path, to provide a redundancy of 100% of working capacity. When a SONET/SDH network link is requested, both working and protection data paths are allocated.

As used herein "SONET/SDH" refers both to the SONET specification and to the SDH specification, and to specifications substantially equivalent thereto.

A switching protocol known as APS (automatic protection switching) provides the capability for the protection data path to substitute for the working data path when necessary. SONET/SDH network connections are bidirectional, so the APS protocol can operate in one of two ways. The APS protocol can be bidirectional, in which case the two directions of the network connection between two SONET/SDH network elements are switched together, or it can be unidirectional, in which case the two directions of the network connection between two SONET/SDH network elements can be switched separately.

One problem in the art occurs when coupling a SONET/SDH network to a layer-three router, such as a router in a routing network. The coupling between the SONET/SDH network and the router is a single point of failure, and the single router is itself another single point of failure. It would be desirable to replicate the SONET/SDH network's use of protection data paths in the routing network, such as by using more than one router to make the connection between the routing network and the SONET/SDH network. Using a plurality of such routers would prevent any one router from being a single point of failure.

As used herein, the phrase "routing network" includes a bridging, switching, or routing aspect of a network. This phrase is intended to include networks in which a router (or bridge, switch, or brouter) is used to forward messages. For example, layer-two or layer-three operations in an ISO/OSI model network, as well as layer-four and layer-five operations, are intended to be included. One example of such a network would be an IP network, and its routing protocols, such as the internet.

However, if multiple routers are used to make the connection between the routing network and the SONET/SDH network, routing to and from the working data path and the protection data path can be different. This makes it difficult to route between the SONET/SDH network and the routing network if data uses the working data path in one direction and the protection data path in the other direction. Much of the network equipment in use for present SONET/SDH networks only implements the APS protocol unidirectionally.

Accordingly, it would be advantageous to provide a method and system for coupling a SONET/SDH network to a routing network that does not have a single point of failure. This advantage is achieved in an embodiment of the invention in which multiple routers are coupled between the SONET/SDH network and the routing network, one for each data path, with the routers intercommunicating to force APS to allow only a single router for each bidirectional data path.

SUMMARY OF THE INVENTION

The invention provides a method and system for coupling a SONET/SDH network to a routing network that does not have a single point of failure. Multiple routers are coupled between the SONET/SDH network and the routing network, one for each data path; for example, a first router for the working data path and a second router for the protection data path. The routers intercommunicate to force APS to switch data paths bidirectionally, so as to allow only a single router for each data path.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general or special purpose processors, or other circuits adapted to particular process steps and data structures described herein, and that implementation of the process steps and data structures described herein would not require undue experimentation or further invention.

System Elements

Figure 1:
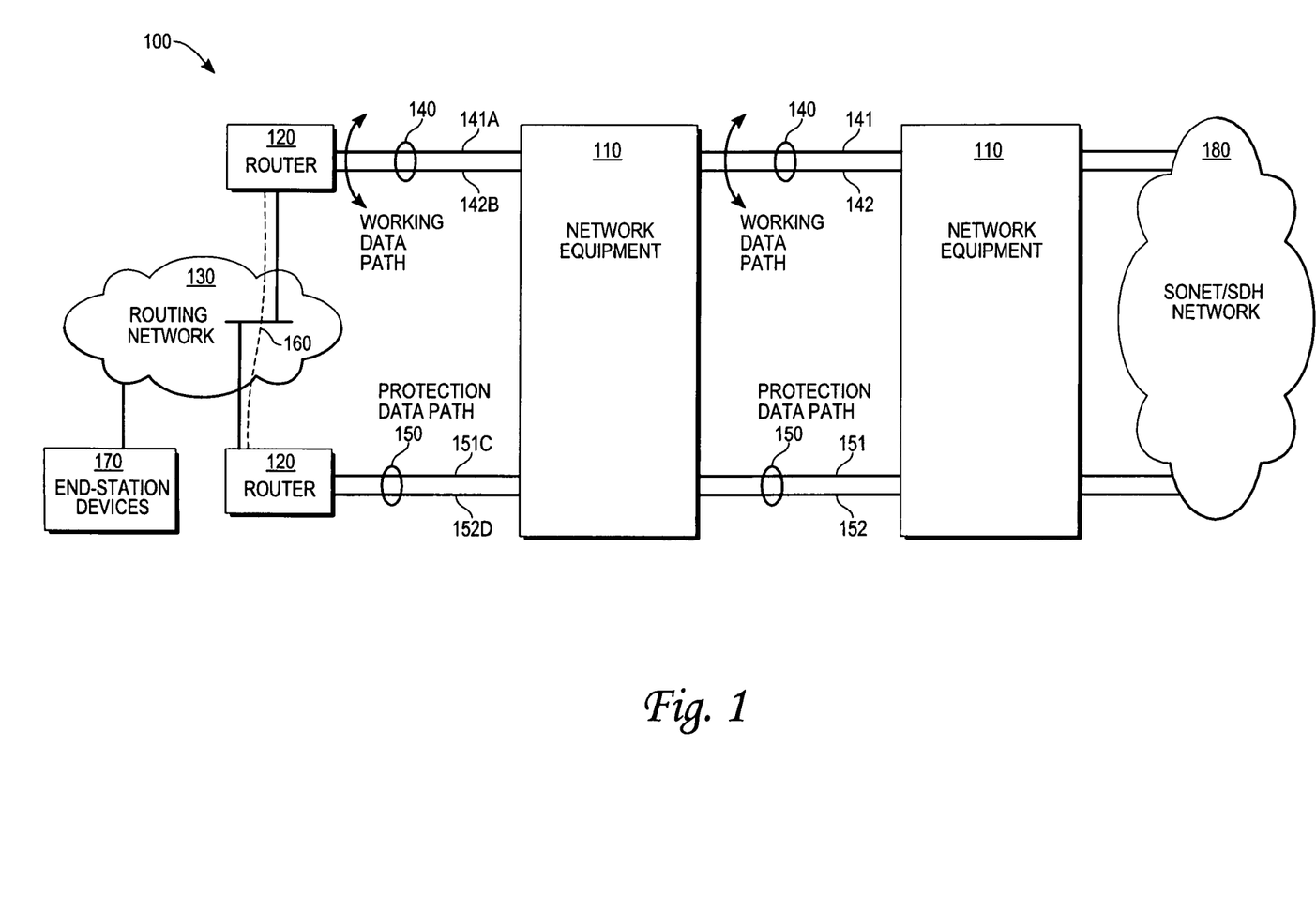
FIG. 1 shows a block diagram of a system for coupling a SONET/SDH network to a routing network using multiple routers.

FIG. 1 shows a block diagram of a system for coupling a SONET/SDH network to a routing network using multiple routers.

A system 100 includes a first NE (network equipment) element 110, a second NE element 110, a first router 120, a second router 120, and a routing network 130. In a preferred embodiment, the second NE element 110 comprises an ADM (add-drop multiplexer). ADMs are known in the art of SONET/SDH network equipment.

The first NE element 110 is coupled to the second NE element 110 using a working data path 140 and a protection data path 150. The working data path 140 is bidirectional and includes a first unidirectional working data path 141 and second unidirectional working data path 142. Similarly, the protection data path 150 is bidirectional and includes a first unidirectional protection data path 151 and second unidirectional protection data path 152.

The second NE element 110 is collectively coupled to the first router 120 and the second router 120 using a working data path 140 and a protection data path 150. The working data path 140 is bidirectional and includes a first unidirectional working data path 141 A and second unidirectional working data path 142 B. Data path 141 A transmits data from the first router 120 to the second NE element 110. Data path 142 B transmits data from the second NE element 110 to the first router 120. Similarly, the protection data path 150 is bidirectional and includes a first unidirectional protection data path 151 C and second unidirectional protection data path 152 D. Data path 151 C transmits data from the second router 120 to the second NE element 110. Data path 152 D transmits data from the second NE element 110 to the second router 120.

The first router 120 is coupled to the second router 120 using a communication path 160 in the routing network 130. In a preferred embodiment, the communication path 160 includes a single LAN (local-access network) to which the first router 120 and the second router 120 are both directly coupled.

The first router 120 and the second router 120 are both coupled to the routing network 130 and are configured to route messages from and to end-station devices 170 coupled to the routing network 130, and from and to the second NE element 110. Thus, the first router 120 and the second router 120 operate in conjunction with the second NE element 110 to transfer data between the routing network 130 and a SONET/SDH network 180 coupled to the first NE element 110 and the second NE element 110.

Method of Operation

Figure 2:
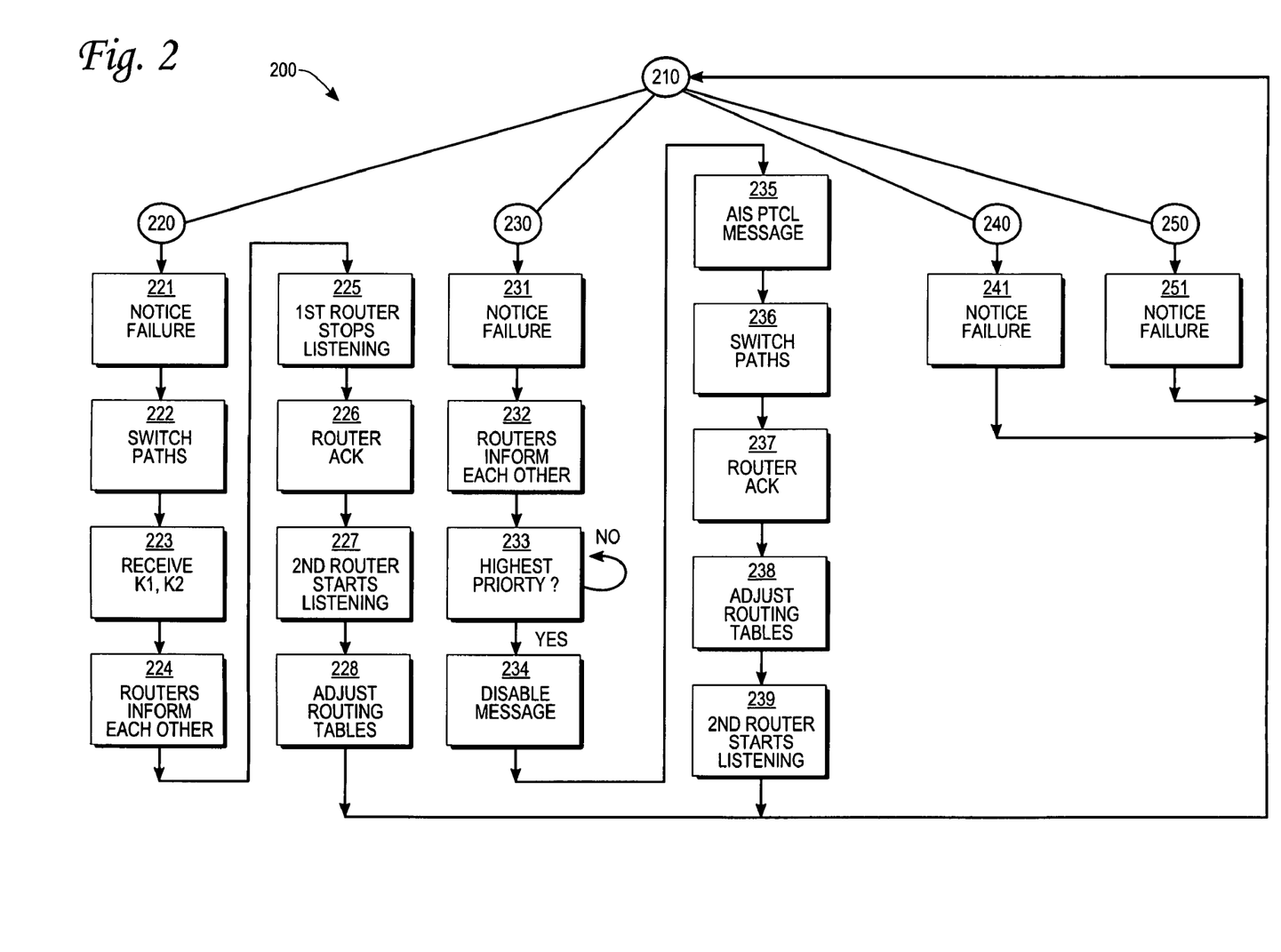
FIG. 2 shows a process flow diagram for an inter-router protocol which forces APS to switch data paths bidirectionally, so as to couple only a single router to each data path.

FIG. 2 shows a process flow diagram for an inter-router protocol which forces APS to switch data paths bidirectionally, so as to couple only a single router to each data path.

A method 200 includes flow points and process steps as described herein, and is performed in conjunction by the second NE element 110, the first router 120, and the second router 120.

At a flow point 210, the second NE element 110 is transmitting data between the routing network 130 and the SONET/SDH network 180 using the working data path 140. The protection data path 150 is held in reserve to protect against the possibility that the working data path 140 will fail, or will sufficiently degrade that the protection data path 150 becomes superior for transmitting data. If the protection data path 150 is used for transmitting data, the working data path 140 will take over the previous role of the protection data path 150. The working data path 140 will thus be held in reserve to protect against the possibility that the protection data path 150 will fail or degrade.

As part of the APS protocol, the second NE element 110 selects one of the two incoming data paths from the routing network 130 (data path 141 A or data path 151 C) for transmission to the SONET/SDH network 180. The second NE element 110 receives data from the selected data path and transmits that data on both of its outgoing data paths (working data path 140 or protection data path 150). Similarly, the second NE element 110 selects on of the two incoming data paths from the SONET/SDH network 180 (working data path 140 or protection data path 150) for transmitting data to the routing network 130. The second NE element 110 receives data from the selected path and transmits that data on both of its outgoing data paths (data path 142 B or data path 152 D).

As part of the APS protocol, the second NE element 110 receives a sequence of K1 and K2 bytes on the data path it does not select for receiving data. Thus, when the second NE element 110 is receiving data from the first NE element 110 on the working data path 140, it is receiving the K1 and K2 bytes on the protection data path 150. Similarly, when the second NE element 110 is receiving data from the first router 120 on the data path 141 A, it is receiving the K1 and K2 bytes on the data path 151 C.

The K1 and K2 bytes are used in the APS protocol to indicate protocol commands, including protocol commands for switching between the working data path 140 (or if there is more than one working data path 140, a selected one thereof) and the protection data path 150. These commands can include one of the following:

LOS (loss of signal)—The signal has been lost for the working data path 140.

LOF (loss of frame)—The frame has been lost for the working data path 140.

AIS (alarm indication signal)—This signal indicates an alarm for the working data path 140.

BER (bit error rate)—The bit error rate for the working data path 140 exceeds a selected threshold.

Thus, at the flow point 210, the data path 141 A transmits actual data, the data path 142 B and the data path 152 D transmit (the same) actual data, and the data path 151 C transmits the K1 and K2 bytes. In normal operation, the K1 and K2 bytes indicate that all data paths are working properly.

The APS protocol is further described in the document GR-253-CORE, available from Bellcore, and known ITU documents specifying and documenting SDH. These documents is hereby incorporated by reference as if fully set forth herein.

From the flow point 210, one of four possible line failures (or degradations) can occur.

Data Path A

At a flow point 220, the data path 141 A fails or degrades.

At a step 221, the second NE element 110 notices the failure or degradation of the data path 141 A.

At a step 222, the second NE element 110 switches from receiving data on its working data path 140 to its protection data path 150. Thus, the second NE element 110 switches from receiving data on the data path 141 A to receiving data on the data path 151 C. As part of performing this step 222, the second NE element 110 sends K1 and K2 bytes on the data path 152 D, using the APS protocol, indicating the switch.

At a step 223, the second router 120 receives the K1 and K2 bytes on the data path 152 D.

At a step 224, the second router 120 informs the first router 120 of the change and disables the connection between the first router 120 and the second NE element 110, using a DISABLE protocol message.

At a step 225, the first router 120 receives the DISABLE protocol message, and responsive thereto, stops listening for transmitted data on the data path 142 B.

At a step 226, the first router 120 acknowledges DISABLE protocol message, using a DISABLE-ACK protocol message it sends to the second router 120.

At a step 227, the second router 120 starts listening for transmitted data on the data path 152 D.

At a step 228, the first router 120 and the second router 120 each change their routing tables to reflect the change in connection between the routing network 130 and the SONET/SDH network 180.

This change to the routing tables for the first router 120 and the second router 120 is seen by the rest of the routing network 130 according to routing protocols used by the routing network 130 and implemented by the first router 120 and the second router 120. Many such routing protocols, such as the IGRP routing protocol, are known in the art of computer networks.

The method continues at the flow point 210.

Data Path B

At a flow point 230, the data path 142 B fails or degrades.

At a step 231, the first router 120 notices the failure or degradation of the data path 142 B.

At a step 232, the first router 120 informs the second router 120 of the change, using a LINE-STATE-CHANGE protocol message.

At a step 233, the second router 120 evaluates a priority for the LINE-STATE-CHANGE protocol message, and determines to act on its highest priority. If the second router 120 determines that the LINE-STATE-CHANGE protocol message is not its highest priority, it performs and completes some other task, and the method returns to repeat this step 233. If the second router 120 determines that the LINE-STATE-CHANGE protocol message is its highest priority, the method continues with the step 234.

The second router 120 might determine whether the LINE-STATE-CHANGE protocol message is its highest priority responsive to a number of factors, including (a) whether there is another state change requiring more immediate action, or (b) whether the state change for the data path 142 B is sufficient to warrant propagating the LINE-STATE-CHANGE protocol message as described herein.

At a step 234, the second router 120 disables the connection between the first router 120 and the second NE element 110, using a DISABLE protocol message.

At a step 235, the first router 120 receives the DISABLE protocol message, and responsive thereto, sends an AIS protocol message (using the APS protocol) to the second NE element 110 on the data path 141 A.

At a step 236, the second NE element 110 receives the AIS protocol message, and responsive thereto, switches from its working data path 140 to its protection data path 150. Thus, the second NE element 110 switches from receiving data on the data path 141 A to receiving data on the data path 151 C.

At a step 237, the first router 120 acknowledges the DISABLE protocol message, using a DISABLE-ACK protocol message it sends to the second router 120.

At a step 238, similar to the step 228, the first router 120 and the second router 120 each change their routing tables to reflect the change in connection between the routing network 130 and the SONET/SDH network 180.

At a step 239, the second router 120 starts listening for transmitted data on the data path 152 D.

The method continues at the flow point 210.

Data Path C

At a flow point 240, the data path 151 C fails or degrades.

At a step 241, the second NE element 110 notices the failure or degradation of the data path 151 C.

Because the data path 151 C is a protection data path 150, the second NE element 110 takes no action responsive to the failure or degradation thereof.

The method continues at the flow point 210.

Data Path D

At a flow point 250, the data path 152 D fails or degrades.

At a step 251, the second router 120 notices the failure or degradation of the data path 152 D.

Because the data path 152 D is a protection data path 150, the second router 120 takes no action responsive to the failure or degradation thereof.

The method continues at the flow point 210.

Reversal of Data Path Roles

As shown herein, when the working data path fails or degrades, use is switched over to the protection data path. When the working data path is recovered, the APS protocol can revert back to the working data path, by essentially reversing the switching steps shown herein. Alternatively, the APS protocol can reverse the roles of the working data path and the protection data path, thus making the old protection data path serve the role of a new working data path and making the old working data path serve the role of a new protection data path.

ALTERNATIVE EMBODIMENTS

Although preferred embodiments are disclosed herein, many variations are possible which remain within the concept, scope, and spirit of the invention, and these variations would become clear to those skilled in the art after perusal of this application.

In particular, although a preferred embodiment is shown using a "one plus one" system with the APS protocol, variants using a "one to N" system are within the scope and spirit of the invention. Those skilled in the art would recognize that such systems could be made and used based on this application, and would not require undue experiment or further invention.

The invention claimed is:

1. A method for communicatively coupling a first network to a second network by using a first device and a second device, the method comprising the steps of:

causing first data to be transmitted and second data to be received over a first bidirectional data path but not over a second bidirectional data path, wherein:

said first bidirectional data path communicatively couples said first device to said second network;

said first device is communicatively coupled to said first network;

said second bidirectional data path communicatively couples said second device to said second network;

said second device is communicatively coupled to said first network;

said first network is associated with a first network type, said second network is associated with a second network type, and said first network type is different than said second network type;

based on transmitting said first data and receiving said second data over said first bidirectional data path, determining that one or more criteria are satisfied;

in response to determining that said one or more criteria are satisfied:

causing said first data to no longer be transmitted and said second data to no longer be received over said first bidirectional data path; and causing said first data to be transmitted and said second data to be received over said second bidirectional data path but not over said first bidirectional data path;

based on transmitting said first data and receiving said second data over said second bidirectional data path, determining that said one or more criteria are satisfied;

in response to determining that said one or more criteria are satisfied:

causing said first data to no longer be transmitted and said second data to no longer be received over said second bidirectional data path; and causing said first data to be transmitted and said second data to be received over said first bidirectional data path but not over said second bidirectional data path.

2. The method as recited in claim 1, wherein:

said first bidirectional data path includes a first unidirectional sending data path and a first unidirectional receiving data path;

said first bidirectional data path is used for transmitting and receiving data between said first network and said second network;
said second bidirectional data path includes a second unidirectional sending data path and a second unidirectional receiving data path;
said second bidirectional data path is used for transmitting and receiving information for use in determining that the one or more criteria are satisfied;
the first network type is a SONET network type;
the second network type is not SONET network type; and
the method further comprising the steps of:
in response to determining that said one or more criteria are satisfied, causing said second device to send a command to said first device over a third data path; and
wherein in response to receiving said command, said first device no longer transmits said first data and no longer receives said second data over said first bidirectional data path.

3. The method as recited in claim 1, wherein;
said first bidirectional data path is designated as a working data path;
said second bidirectional data path is designated as a protection data path;
said first device is a first router;
said second device is a second router;
said first network type is a routing network type;
said second network type is a SONET/SDH network type; and
said one or more criteria are selected from the group consisting of (a) a first criterion that indicates a failure of a particular data path over which said first data is being transmitted and said second data is being received and (b) a second criterion that indicates an unacceptable degradation in transmitting said first data and receiving said second data over said particular data path.

4. The method as recited in claim 1, wherein:
said first bidirectional data path includes a first unidirectional sending data path and a first unidirectional receiving data path;
the step of causing first data to be transmitted and second data to be received over said first bidirectional data path but not over said second bidirectional data path includes the steps of:
causing said first data to be transmitted from said first device to said second network over said first unidirectional sending data path; and
causing said second data to be received from said second network to said first device over said first unidirectional receiving data path;
said second bidirectional data path includes a second unidirectional sending data path and a second unidirectional receiving data path; and
the step of causing said first data to be transmitted and said second data to be received over said second bidirectional data path but not over said first bidirectional data path includes the steps of:
causing said first data to be transmitted from said first device to said second network over said second unidirectional sending data path; and
causing said second data to be received from said second network to said first device over said second unidirectional receiving data path.

5. The method as recited in claim 1, further comprising the steps of:
causing third data to be transmitted and fourth data to be received over a third bidirectional data path but not over said second bidirectional data path, wherein said third bidirectional data path communicatively couples a third device to said second network;
based on transmitting said third data and receiving said fourth data over said third bidirectional data path, determining that said one or more criteria are satisfied;
in response to determining that said one or more criteria are satisfied,
causing said third data to no longer be transmitted and said fourth data to no longer be received over said third bidirectional data path; and
causing said third data to be transmitted and said fourth data to be received over said second bidirectional data path but not over said third bidirectional data path.

6. An apparatus for communicatively coupling a first network to a second network by using a first device and a second device, the apparatus comprising:
means for causing first data to be transmitted and second data to be received over a first bidirectional data path but not over a second bidirectional data path, wherein:
said first bidirectional data path communicatively couples said first device to said second network;
said first device is communicatively coupled to said first network;
said second bidirectional data path communicatively couples said second device to said second network;
said second device is communicatively coupled to said first network;
said first network is associated with a first network type, said second network is associated with a second network type, and said first network type is different than said second network type;
means for determining, based on transmitting said first data and receiving said second data over said first bidirectional data path, that one or more criteria are satisfied;
in response to determining that said one or more criteria are satisfied,
means for causing said first data to no longer be transmitted and said second data to no longer be received over said first bidirectional data path; and
means for causing said first data to be transmitted and said second data to be received over said second bidirectional data path but not over said first bidirectional data path;
means for determining, based on transmitting said first data and receiving said second data over said second bidirectional data path, that said one or more criteria are satisfied;
means for causing, in response to determining that said one or more criteria are satisfied, said first data to no longer be transmitted and said second data to no longer be received over said second bidirectional data path; and
means for causing, in response to determining that said one or more criteria are satisfied, said first data to be transmitted and said second data to be received over said first bidirectional data path but not over said second bidirectional data path.

7. The apparatus as recited in claim 6, wherein:
said first bidirectional data path includes a first unidirectional sending data path and a first unidirectional receiving data path;
said first bidirectional data path is used for transmitting and receiving data between said first network and said second network;

said second bidirectional data path includes a second unidirectional sending data path and a second unidirectional receiving data path;
said second bidirectional data path is used for transmitting and receiving information for use in determining that the one or more criteria are satisfied;
the first network type is a SONET network type;
the second network type is not SONET network type; and
the apparatus further comprising:
means for causing, in response to determining that said one or more criteria are satisfied, said second device to send a command to said first device over a third data path; and
wherein in response to receiving said command, said first device no longer transmits said first data and no longer receives said second data over said first bidirectional data path.

8. The apparatus as recited in claim 6, wherein;
said first bidirectional data path is designated as a working data path;
said second bidirectional data path is designated as a protection data path;
said first device is a first router;
said second device is a second router;
said first network type is a routing network type;
said second network type is a SONET/SDH network type; and
said one or more criteria are selected from the group consisting of (a) a first criterion that indicates a failure of a particular data path over which said first data is being transmitted and said second data is being received and (b) a second criterion that indicates an unacceptable degradation in transmitting said first data and receiving said second data over said particular data path.

9. The apparatus as recited in claim 6, wherein:
said first bidirectional data path includes a first unidirectional sending data path and a first unidirectional receiving data path;
the means for causing first data to be transmitted and second data to be received over said first bidirectional data path but not over said second bidirectional data path includes:
means for causing said first data to be transmitted from said first device to said second network over said first unidirectional sending data path; and
means for causing said second data to be received from said second network to said first device over said first unidirectional receiving data path;
said second bidirectional data path includes a second unidirectional sending data path and a second unidirectional receiving data path; and
the means for causing said first data to be transmitted and said second data to be received over said second bidirectional data path but not over said first bidirectional data path includes:
means for causing said first data to be transmitted from said first device to said second network over said second unidirectional sending data path; and
means for causing said second data to be received from said second network to said first device over said second unidirectional receiving data path.

10. An The apparatus as recited in claim 6, further comprising:
means for causing third data to be transmitted and fourth data to be received over a third bidirectional data path but not over said second bidirectional data path, wherein said third bidirectional data path communicatively couples a third device to said second network;
means for determining, based on transmitting said third data and receiving said fourth data over said third bidirectional data path, that said one or more criteria are satisfied;
in response to determining that said one or more criteria are satisfied,
means for causing said third data to no longer be transmitted and said fourth data to no longer be received over said third bidirectional data path; and
means for causing said third data to be transmitted and said fourth data to be received over said second bidirectional data path but not over said third bidirectional data path.

11. A network equipment element configured for communicatively coupling a first network to a second network by using a first device and a second device, and configured to perform:
causing first data to be transmitted and second data to be received over a first bidirectional data path but not over a second bidirectional data path, wherein:
said first bidirectional data path communicatively couples said first device to said second network;
said first device is communicatively coupled to said first network;
said second bidirectional data path communicatively couples said second device to said second network;
said second device is communicatively coupled to said first network;
said first network is associated with a first network type, said second network is associated with a second network type, and said first network type is different than said second network type;
based on transmitting said first data and receiving said second data over said first bidirectional data path, determining that one or more criteria are satisfied;
in response to determining that said one or more criteria are satisfied:
causing said first data to no longer be transmitted and said second data to no longer be received over said first bidirectional data path; and
causing said first data to be transmitted and said second data to be received over said second bidirectional data path but not over said first bidirectional data path;
based on transmitting said first data and receiving said second data over said second bidirectional data path, determining that said one or more criteria are satisfied;
in response to determining that said one or more criteria are satisfied:
causing said first data to no longer be transmitted and said second data to no longer be received over said second bidirectional data path; and
causing said first data to be transmitted and said second data to be received over said first bidirectional data path but not over said second bidirectional data path.

12. The network equipment element as recited in claim 11, wherein:
said first bidirectional data path includes a first unidirectional sending data path and a first unidirectional receiving data path;
said first bidirectional data path is used for transmitting and receiving data between said first network and said second network;
said second bidirectional data path includes a second unidirectional sending data path and a second unidirectional receiving data path;

said second bidirectional data path is used for transmitting and receiving information for use in determining that the one or more criteria are satisfied;
the first network type is a SONET network type;
the second network type is not SONET network type; and
the network equipment element configured to perform:
in response to determining that said one or more criteria are satisfied, causing said second device to send a command to said first device over a third data path; and
wherein in response to receiving said command, said first device no longer transmits said first data and no longer receives said second data over said first bidirectional data path.

13. The network equipment element as recited in claim 11, wherein;
said first bidirectional data path is designated as a working data path;
said second bidirectional data path is designated as a protection data path;
said first device is a first router;
said second device is a second router;
said first network type is a routing network type;
said second network type is a SONET/SDH network type; and
said one or more criteria are selected from the group consisting of (a) a first criterion that indicates a failure of a particular data path over which said first data is being transmitted and said second data is being received and (b) a second criterion that indicates an unacceptable degradation in transmitting said first data and receiving said second data over said particular data path.

14. The network equipment element as recited in claim 11, wherein:
said first bidirectional data path includes a first unidirectional sending data path and a first unidirectional receiving data path;
further said network equipment element is further configured to perform:
causing said first data to be transmitted from said first device to said second network over said first unidirectional sending data path; and
causing said second data to be received from said second network to said first device over said first unidirectional receiving data path;
said second bidirectional data path includes a second unidirectional sending data path and a second unidirectional receiving data path; and
further said network equipment element is further configured to perform:
causing said first data to be transmitted from said first device to said second network over said second unidirectional sending data path; and
causing said second data to be received from said second network to said first device over said second unidirectional receiving data path.

15. The network equipment element as recited in claim 11, further configured to perform:
causing third data to be transmitted and fourth data to be received over a third bidirectional data path but not over said second bidirectional data path, wherein said third bidirectional data path communicatively couples a third device to said second network;
based on transmitting said third data and receiving said fourth data over said third bidirectional data path, determining that said one or more criteria are satisfied;

in response to determining that said one or more criteria are satisfied,
causing said third data to no longer be transmitted and said fourth data to no longer be received over said third bidirectional data path; and
causing said third data to be transmitted and said fourth data to be received over said second bidirectional data path but not over said third bidirectional data path.

16. A system for communicatively coupling a first network to a second network, the system comprising:
a first device that is communicatively coupled to said second network through a first bidirectional data path, wherein said first device is communicatively coupled to said first network;
a second device that is communicatively coupled to said second network through a second bidirectional data path, wherein said second device is communicatively coupled to said first network;
wherein:
said first network is associated with a first network type, said second network is associated with a second network type, and said first network type is different than said second network type;
said first device is configured to transmit first data and receive second data over said first bidirectional data path but said second device is not configured to transmit first data or receive second data said data over said second bidirectional data path;
said second device is configured to:
determine, based on said first data that is transmitted and said second data that is received over said first bidirectional data path, that one or more criteria are satisfied;
in response to determining that said one or more criteria are satisfied:
cause said first data to no longer be transmitted and said second data to no longer be received over said first bidirectional data path; and
cause said first data to be transmitted and said second data to be received over said second bidirectional data path but not over said first bidirectional data path;
said first device is configured to:
determine, based on said first data that is transmitted and said second data that is received over said second bidirectional data path, that said one or more criteria are satisfied;
in response to determining that said one or more criteria are satisfied:
cause said first data to no longer be transmitted and said second data to no longer be received over said second bidirectional data path; and
cause said first data to be transmitted and said second data to be received over said first bidirectional data path but not over said second bidirectional data path.

17. The system as recited in claim 16, wherein:
said first bidirectional data path includes a first unidirectional sending data path and a first unidirectional receiving data path;
said first bidirectional data path is used for transmitting and receiving data between said first network and said second network;
said second bidirectional data path includes a second unidirectional sending data path and a second unidirectional receiving data path;

said second bidirectional data path is used for transmitting and receiving information for use in determining that the one or more criteria are satisfied;
the first network type is a SONET network type;
the second network type is not SONET network type;
said second device is configured to send, in response to determining that said one or more criteria are satisfied, a command to said first device over a third data path; and
said first device is configured to, in response to receiving said command, no longer transmit said first data and no longer receive said second data over said first bidirectional data path.

18. The system as recited in claim 16, wherein:
said first bidirectional data path is designated as a working data path;
said second bidirectional data path is designated as a protection data path;
said first device is a first router;
said second device is a second router;
said first network type is a routing network type;
said second network type is a SONET/SDH network type; and
said one or more criteria are selected from the group consisting of (a) a first criterion that indicates a failure of a particular data path over which said first data is being transmitted and said second data is being received and (b) a second criterion that indicates an unacceptable degradation in transmitting said first data and receiving said second data over said particular data path.

19. The system as recited in claim 16, wherein:
said first bidirectional data path includes a first unidirectional sending data path and a first unidirectional receiving data path;
said first device being configured to transmit said first data and receive said second data over a first bidirectional data path includes being configured to transmit said first data to said second network over said first unidirectional sending data path and to receive said second data from said second network over said first unidirectional receiving data path;
said second bidirectional data path includes a second unidirectional sending data path and a second unidirectional receiving data path; and
said second device being configured to transmit said first data and receive said second data over said second bidirectional data path includes being configured to transmit said first data to said second network over said second unidirectional sending data path and to receive said second data from said second network over said second unidirectional receiving data path.

20. The system as recited in claim 16, further comprising:
a third device that is communicatively coupled to said second network through a third bidirectional data path, wherein said third device is communicatively coupled to said first network;
wherein:
said third device is configured to transmit third data and receive fourth data over said third bidirectional data path but said second device is not configured to transmit said third data or receive fourth data over said second bidirectional data path;
said second device is configured to:
determine, based on said third data that is transmitted and said fourth data that is received over said third bidirectional data path, that one or more criteria are satisfied;
in response to determining that said one or more criteria are satisfied, cause said third data to no longer be transmitted and said fourth data to no longer be received over said third bidirectional data path; and
cause said third data to be transmitted and said fourth data to be received over said second bidirectional data path but not over said third bidirectional data path.

* * * * *